United States Patent [19]

Shinoda et al.

[11] 4,420,465

[45] Dec. 13, 1983

[54] PROCESS FOR DESULFURIZING AN EXHAUST GAS

[75] Inventors: Naoharu Shinoda; Atsushi Tatani; Naohiko Ukawa; Michio Oshima; Susumu Okino; Sadaichi Shigeta, all of Hiroshima, Japan

[73] Assignee: Mitsubishi Jukogyo Kabushiki Kaisha, Tokyo, Japan

[21] Appl. No.: 390,835

[22] Filed: Jun. 22, 1982

[30] Foreign Application Priority Data

Jun. 22, 1981 [JP] Japan .................................. 56-95258

[51] Int. Cl.$^3$ .............................................. C01B 17/00
[52] U.S. Cl. ..................................... 423/242; 423/166
[58] Field of Search .......... 423/242 A, 242 R, 244 A, 423/244 R, 166, 555

[56] References Cited

U.S. PATENT DOCUMENTS

| | | | |
|---|---|---|---|
| 2,342,704 | 2/1944 | Striplin | 423/242 |
| 3,836,630 | 9/1974 | Noguchi et al. | 423/242 |
| 3,920,794 | 11/1975 | La Mantia et al. | 423/242 |

*Primary Examiner*—Gregory A. Heller
*Attorney, Agent, or Firm*—Wenderoth, Lind & Ponack

[57] ABSTRACT

A process for desulfurizing an exhaust gas which comprises desulfurizing an exhaust gas containing $SO_2$ by bringing it into contact with a slurry containing calcium compounds and aluminum compounds, characterized in that the concentration of the dissolved aluminum ion in said slurry is detected and a manganese compound is supplied into said slurry in such a manner that the ratio of the concentration of manganese (including both solid and liquid) to said concentration of the dissolved aluminum ion may be maintained in a molar ratio of less than 1 in said slurry.

3 Claims, 3 Drawing Figures

PROCESS FOR DESULFURIZING AN EXHAUST GAS

The present invention relates to a process for desulfurizing an exhaust gas. More particularly, the invention relates to an improvement in or relating to a process for desulfurizing an exhaust gas according to so-called liquid purification with lime or gypsum to remove $SO_2$ contained in a combustion exhaust gas by the use of limestone or slaked lime as a material of an absorbent.

In an absorption step for desulfurizing an exhaust gas by liquid purification with lime or gypsum, an exhaust gas containing $SO_2$ is brought into contact with a slurry containing calcium compounds low in solubility. These calcium compounds are $Ca(OH)_2$, $CaCO_3$, $CaSO_3 \cdot \frac{1}{2}H_2O$ and $CaSO_4 \cdot 2H_2O$, whereby $SO_2$ is absorbed from the exhaust gas. When this $SO_2$ absorbing reaction is expressed by an overall reaction formulae, it is as follows.

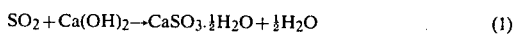

$$SO_2 + Ca(OH)_2 \rightarrow CaSO_3 \cdot \tfrac{1}{2}H_2O + \tfrac{1}{2}H_2O \quad (1)$$

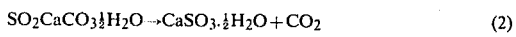

$$SO_2 \cdot CaCO_3 \tfrac{1}{2}H_2O \rightarrow CaSO_3 \cdot \tfrac{1}{2}H_2O + CO_2 \quad (2)$$

When oxygen is contained in the exhaust gas, the following oxidation reaction is also brought about:

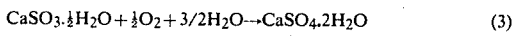

$$CaSO_3 \cdot \tfrac{1}{2}H_2O + \tfrac{1}{2}O_2 + 3/2H_2O \rightarrow CaSO_4 \cdot 2H_2O \quad (3)$$

As such, the overall reaction formulae are simple, but, the actual reaction mechanism is not that simple, because the various ions are said to participate in very complicated patterns. Thus, the chemical factors which exert their influences on the desulfurization in the absorption step are diverse. This is apparent from the fact that even now, various different analyses are conducted on the bases of various researches and diverse processes for desulfurization are proposed. Research study on the complicated reaction for absorbing $SO_2$ in a gas—liquid—solid 3-phase system besides the influence brought about by trace elements is unlimited.

In a combustion exhaust gas, besides $SO_2$, many compounds such as an ammonia compound, a halogen compound and dust are contained as minor constituents. The composition of such dust is diverse depending on the source of the exhaust gas, and that its composition is more complicated and diverse is not difficult to imagine.

And $Ca(OH)_2$ and $CaCO_3$ used as absorbents for $SO_2$ are prepared from naturally produced limestone, which also contains various elements such as aluminum, silicon and iron as impurities.

And it goes without saying that make-up water, which is indispensable in liquid purification, also contains impurities.

As mentioned above also, as one of those contained as minor constituents besides $SO_2$ in the slurry used in the absorption step in the equipment for desulfurizing an exhaust gas according to liquid purification with lime or gypsum, there are aluminum compounds. The aluminum compounds originate from dust contained in the exhaust gas, the absorbent and the make-up water. Namely, in each of the exhaust gas, the make-up water and the absorbent flowing in the absorption test, an aluminum compound is contained though somewhat different in concentration.

We, the present inventors, faced the phenomenon that the desulfurization performances lowered from reasons attributable to these aluminium compounds, having worked the countermeasures to solve this problem from various angles.

As one of the countermeasures, there is a method of promoting the discharge of the aluminum compounds to the outside of the system. This is a method of restraining to low levels the concentrations of the aluminum compounds contained in the slurry in the absorption step by such means as neutralizing the aluminum compounds, thereby precipitating and separating the same or increasing the displacements for minimizing the lowering of the desulfurization performance. However, the operations of precipitating and separating the aluminum compounds by neutralization are troublesome and uneconomical. On the other hand, increase of the displacements does not concur with the contemporary needs in respect to preventing of secondary environmental pollution caused by displaced water. This is especially since the main component of dust contained in a coal combustion exhaust gas is aluminum, upon disposing such exhaust gas in an equipment for desulfurizing an exhaust gas according to liquid purification with lime or gypsum, the amounts of aluminum compounds flowing in the absorption step increases, which prevents a decrease in the desulfurization, and thus the inconvenience of increased neutralized amounts and increased displacements is brought about.

The reaction mechanism through which the aluminum compounds affect the desulfurization performance has not sufficiently been elucidated yet to date; however, we have confirmed that, as shown in FIG. 1, as the concentration of aluminum ion increased, the desulfurization performance is remarkably lowered.

Whether all of the aluminum compounds flowing in the absorption step dissolves and exists as aluminum ions, or a part thereof dissolves and the rest exists as solid-phase aluminum compounds, differs depending on the history of the aluminum compounds and the atmosphere and condition of the place; therefore, the nature of the aluminum compounds is uncertain. For example, when the place of production of coal was different, the degree of dissolution of an aluminum compound contained in the dust produced from the combustion of the coal in the absorption step became different, according to Applicants' experience.

At present, it is impossible to theoretically elucidate as to at what the ratio of the aluminum compounds contained in substances such as absorbent, the make-up water and the exhaust gas flowing in the absorption step exist in a liquid phase and a solid phase in a slurry, respectively; however, Applicants' have confirmed at least empirically that they hardly exist the liquid phase, but do exist in the solid phase on some occasion. On the other hand, said compounds dissolve in the liquid phase, but hardly exist in the solid phase in some other occasions.

The present invention is characterized in that a manganese compound is supplied into the absorption step for the purpose of preventing the lowering of the desulfurization performance brought about by aluminum compounds contained in a slurry in the absorption step and the ratio of the feed amount of the manganese compound M (mol/hr: as Mn) to the concentration of dissolved aluminum ion A (mol/hr: as Al) of aluminum compounds flowing in the absorption step, M/A is so made as to be a positive less than 1. This ratio exists in the process for desulfurizing an exhaust gas according to a liquid purification method with lime or gypsum removing the $SO_2$ contained in the combustion exhaust gas by the use of limestone or slaked lime as a material of an absorbent.

According to the present invention, operations to exclude aluminum compounds, namely, precipitation and separation by neutralization and increase of the displacements mentioned above become unnecessary and yet it is possible to prevent lowering of the desulfurization performance.

In terms of reaction mechanism, it is theoretically unclear as to why a manganese compound can prevent the lowering of the desulfurization performance brought about by aluminum compounds. However, we have found that, as shown in FIG. 2, that despite the existence of aluminum compounds, the addition of a manganese compound resulted in remarkable recovery of the desulfurization performance.

Namely, upon absorbing $SO_2$ contained in a combustion exhaust gas by a slurry containing calcium compounds in a system in which there are aluminum compounds, the discovery that the addition of a manganese compound has a remarkable effect on the advancement of the desulfurization performance has enabled us to complete the present invention.

A manganese compound has heretofore been well known as a catalyst promoting an oxidation reaction and supply of a manganese compound to the absorption step in a process for liquid purification of an exhaust gas resulted in promoting the production of gypsum by oxidation has also been known; however, in the latter case, a considerably large amount of the manganese compound has been added.

The present inventors have discovered, for the first time, that the lowering of the desulfurization performance brought about by dissolved aluminum ion in the exhaust gas desulfurization step can be reduced by adding a manganese compound at a specified ratio to the dissolved aluminum ion. As regards the adding ratio, as will be apparent from FIG. 2, that by supplying the manganese compound to maintain the concentration of manganese (including both solid and liquid) within the concentration of the dissolved aluminum ion such that it is at a molar ratio less than 1, normally within the range of 1–0.01 in said slurry, the adverse effect on the desulfurization performance by the aluminum compounds is completely obstructed, however, it is useless to oversupply manganese such as to make the M/A mre than 1. Accordingly, it is preferable to supply a manganese compound within the range such that M/A is a positive number less than 1.

Again, a manganese compound, generally when utilized in the form of an aqueous solution of manganese sulfate, can be quantitatively supplied easier in the absorption step; however, the form is not limited to manganese sulfate only and insofar as a compound contains manganese, any manganese compound is effective such as manganese chloride, manganese dioxide, potassium permanganate and manganese acetate.

Because the feed amount M of a manganese compound to the absorption step may be at most the same as the concentration of the dissolved aluminum ion A, said amount is normally far smaller as compared with the amount of a calcium compound supplied in concomitance with the absorption of $SO_2$.

For detecting the inflowing amounts of aluminum compounds, it suffices to determine the concentration of dust contained in the exhaust gas and the content amount of an aluminum compounds in the dust, as well as the content of the aluminum compounds in the absorbent and make-up water, respectively. Then the amount of A may be calculated. To calculate the amount of A, a magnesium compound may be supplied corresponding to the amount of the aluminum ion dissolved in A; however, as mentioned above, it is difficult to pre-estimate as to at what ratio the aluminum compounds exist in a liquid phase vis-a-vis the solid phase. Accordingly, although it is one of the principles to define the feed amount M of the manganese compound on the basis of A to be calculated, it is permissible to seek the amounts of the aluminum compounds existing in the liquid phase from the analytical data at the time of operating the desulfurization equipment and then decide the feed amount M of the manganese compound corresponding to the found values. Namely, it is possible to determine a method of detecting the concentration of the aluminum ion dissolved in the liquid phase in a slurry in the absorption step by analysis and then to operate and manage the exhaust gas desulfurization equipment so that the concentration of manganese may be maintained corresponding to said concentration.

EXAMPLE

Figure 3:
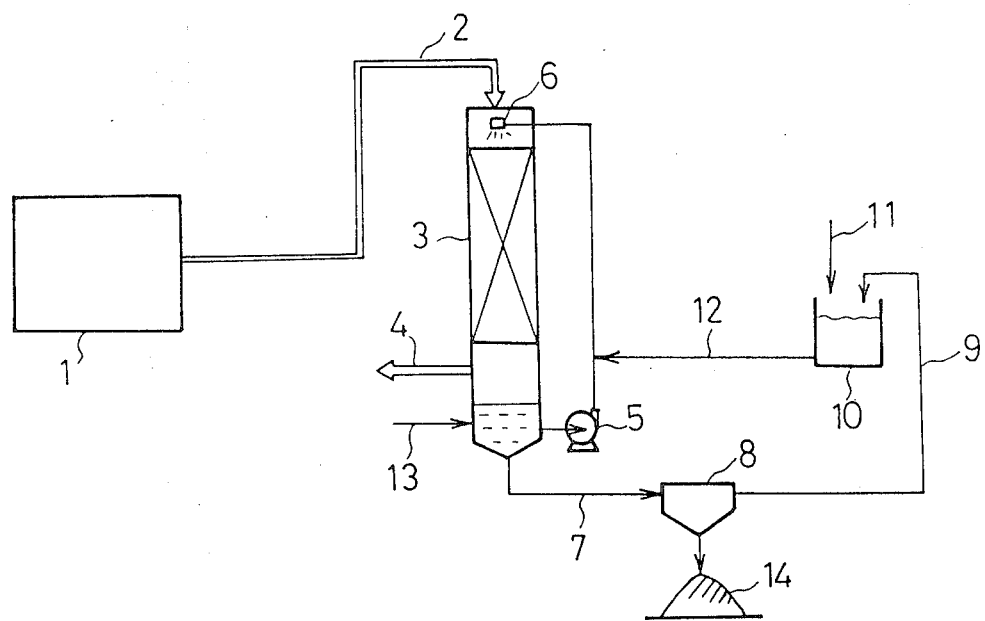
FIG. 3 is a flow sheet showing one embodiment of the process according to the present invention.

Referring to FIG. 3 of the accompanying drawings, one embodiment of the present invention will be explained.

An exhaust gas 2 leaving a coal combustion equipment 1 composed of a coal combustion furnace, a gas cooler and a dry dust collector, consisted of a gas containing 1,200 ppm of $SO_2$ and 10–2,000 mg/m$^3$N of dust at about 70° C. and was introduced into an absorption column 3 at a rate of about 2,000 m$^3$N/H. In the absorption column 3, the exhaust gas was brought into contact with a slurry jetted from a spray nozzle 6 and discharged from the absorption column 3 as an exhaust gas 4 in which $SO_2$ and dust have been removed therefrom. In the absorption column, the slurry containing calcium compounds, such as $CaSO_3.\frac{1}{2}H_2P_1$ produced upon absorbing $SO_2$, $CaSO_4.2H_2O$ produced by oxidation and an absorbent $CaCO_3$ and dust circulated via the spray nozzle 6 from a circulation pump 5 in connection with the absorption column. The circulating rate throughout was 30 m$^3$/H.

The dust contained in the exhaust gas 2 was found, by analysis, to contain a large amount of an aluminum compound, i.e., in the form of $Al_2O_3$ in an amount of about 29% by weight in the dust. This dust dissolved in the circulating slurry, becomes $Al^{3+}$ ions. The slurry containing the calcium compounds and the aluminum compound are circulated by the circulation pump 5 of the absorption column, while on the other hand, a part of the slurry is forwarded through a line 7 to a solid-liquid separator 8 at a rate of about 100 l/H, thus separating that part of the slurry to a solid 14 consisting mainly of $CaSO_4.2H_2O$ and a supernatant liquid 9. The supernatant liquid 9 is forwarded to an absorbent tank 10, where it is mixed with a calcium carbonate slurry 11 and supplied through a line 12 to the absorption column 3 as about an 8% by weight n calcium carbonate slurry at a rate of about 125 l/H.

Figure 1:
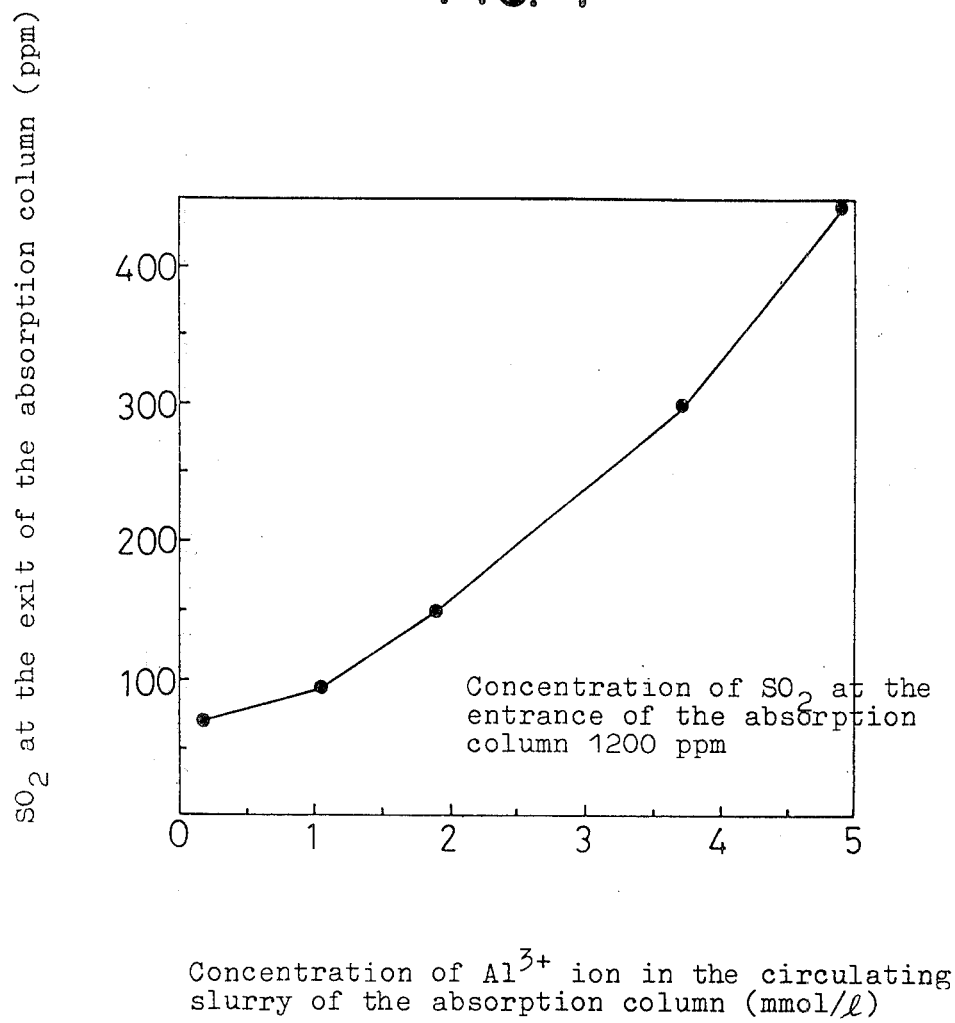
FIG. 1 is a graph showing the results of a test in which the increase of the concentration of $Al^{3+}$ ions in a circulating slurry of an absorption column results in a lowering of the desulfurization performance.

When the concentration of the dust contained in the exhaust gas 2, namely, the concentration of the aluminum compound was varied, the data on the concentration of n the $Al^{3+}$ ions in the circulating slurry of the absorption column relative to the concentration of $SO_2$ at the exit of the absorption column in the exhaust gas 4 are shown in FIG. 1. It is seen from FIG. 1 that as the concentration of the $Al^{3+}$ ion increases, the concentration of $SO_2$ at the exit of the absorption column increases, that is, the desulfurization performance lowers.

Figure 2:
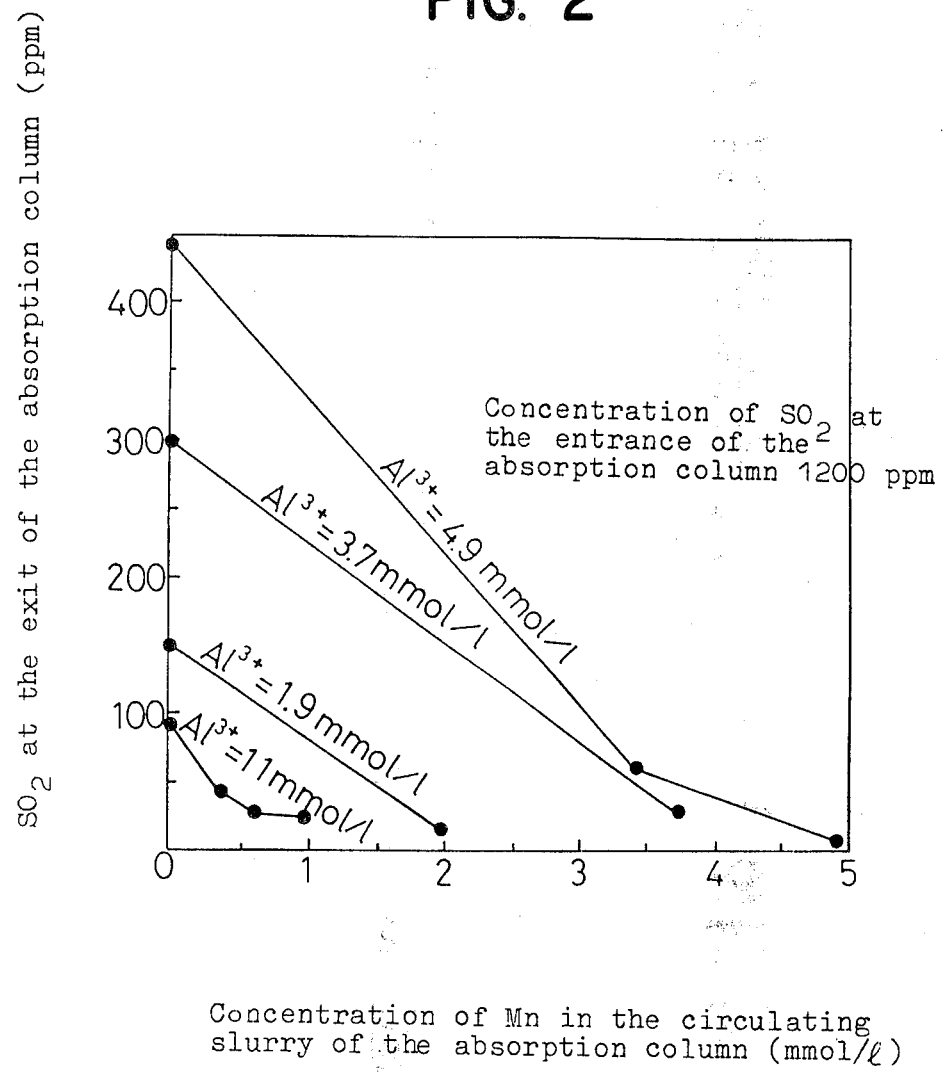
FIG. 2 is a graph showing the results of a test in which the addition of a Mn compound to a circulating slurry containing $Al^{3+}$ ions in an absorption column resulted in an improvement in the desulfurization performance.

Next, when a manganese compound was supplied from a line 13 to the absorption column in which its concentration was made to vary, the degree of improvement in of the desulfurization performance is shown in FIG. 2. From FIG. 2, it is seen that by addition of a manganese compound, especially when the Mn/A molar ratios were less than 1, there is a remarkable improvement in the desulfurization performance.

When the manganese compound supplied from the line 3 to the absorption column 3 was anyone of manganese sulfate, potassium permanganate, manganese chloride, manganese dioxide and manganese acetate, the effect of the same extent was shown.

As is apparent from FIG. 2, in the state in which the desulfurization performance is lowered by the dissolved aluminum ion, when the concentration of the entire manganese, both in the solid and liquid state is increased in the circulating slurry of the absorption column, the desulfurization performance is improved. Further, when the molar ratio of the manganese to the dissolved aluminum is between 0.01 to 1.0 the desulfurization procedure reaches its maximum.

What is claimed is:

1. A process for desulfurizing an exhaust gas which comprises desulfurizing an exhaust gas containing $SO_2$ by contacting the exhaust gas with an aqueous slurry containing calcium compounds as an absorbent and aluminum compounds, said aluminum compounds originating as impurities in the absorbent, the exhaust gas and make-up water used to prepare the slurry, wherein the concentration of dissolved aluminum ions in said slurry is determined and a manganese compound is supplied into said slurry in such a manner that the ratio of the concentration of manganese, including both solid and liquid manganese, to the concentration of the dissolved aluminum ions is in a molar ratio of at least about 0.01 in the slurry so as to improve the desulfurization of the exhaust gas.

2. The process according to claim 1 in which the ratio of the manganese to the dissolved aluminum ion within the slurry falls within a molar ratio of 0.01–1.0.

3. The process according to claim 2 in which limestone or slaked lime is used as an absorbent.

* * * * *